(12) United States Patent
Honya

(10) Patent No.: US 12,548,447 B2
(45) Date of Patent: Feb. 10, 2026

(54) RISK PREDICTION DETERMINATION DEVICE AND RISK PREDICTION DETERMINATION PROGRAM PRODUCT

(71) Applicant: DENSO CORPORATION, Kariya (JP)

(72) Inventor: Hideyuki Honya, Kariya (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 17/988,346

(22) Filed: Nov. 16, 2022

(65) Prior Publication Data

US 2023/0084667 A1 Mar. 16, 2023

Related U.S. Application Data

(63) Continuation of application No. PCT/JP2021/016626, filed on Apr. 26, 2021.

(30) Foreign Application Priority Data

May 19, 2020 (JP) ................................ 2020-087419

(51) Int. Cl.
*G08G 1/16* (2006.01)
*B60W 30/095* (2012.01)
*B60W 30/18* (2012.01)

(52) U.S. Cl.
CPC ......... *G08G 1/164* (2013.01); *B60W 30/0953* (2013.01); *B60W 30/18159* (2020.02); *G08G 1/166* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 2010/0076621 A1 | 3/2010 | Kubotani et al. | |
| 2014/0236484 A1 | 8/2014 | Kinoshita et al. | |
| 2015/0134240 A1 | 5/2015 | Yamada et al. | |
| 2019/0333373 A1* | 10/2019 | Fang | G08G 1/096775 |

(Continued)

FOREIGN PATENT DOCUMENTS

| | | |
|---|---|---|
| CN | 109922439 A | 6/2019 |
| JP | 2000266562 A | 9/2000 |

(Continued)

*Primary Examiner* — Vivek D Koppikar
*Assistant Examiner* — David Ruben Pedersen
(74) *Attorney, Agent, or Firm* — Harness, Dickey & Pierce, P.L.C.

(57) ABSTRACT

A risk prediction determination device includes a predicted traveling route specifying unit, a risk location specifying unit, and a risk prediction determination unit. The predicted traveling route specifying unit specifies a predicted traveling route of a subject vehicle based on traveling lane information indicating a traveling lane of the subject vehicle, road type information indicating a type of a road around the subject vehicle, road link information related to a road link, and sensor information of the subject vehicle. The risk location specifying unit specifies a location with risk based on road shape information around the subject vehicle and location information of an obstacle. The risk prediction determination unit performs a risk prediction determination based on a specified result of the predicted traveling route specifying unit and a specified result of the risk location specifying unit.

7 Claims, 7 Drawing Sheets

(56) References Cited

U.S. PATENT DOCUMENTS

| | | | |
|---|---|---|---|
| 2020/0086855 A1* | 3/2020 | Packer | G05D 1/0289 |
| 2020/0242938 A1* | 7/2020 | Suzuki | G08G 1/052 |
| 2021/0053561 A1* | 2/2021 | Beller | G08G 1/166 |
| 2022/0343762 A1* | 10/2022 | Alvarez | B60W 50/14 |
| 2023/0120172 A1* | 4/2023 | Yoshimatsu | B60W 30/0953 |
| | | | 701/301 |
| 2023/0166763 A1* | 6/2023 | Goto | B60W 40/076 |
| | | | 701/23 |

FOREIGN PATENT DOCUMENTS

| | | | |
|---|---|---|---|
| JP | 3622397 B2 | | 2/2005 |
| JP | 4967015 B2 | | 7/2012 |
| JP | 5893137 B2 | | 3/2016 |
| JP | 2018510373 A | | 4/2018 |
| JP | 2019032711 A | | 2/2019 |
| WO | WO-2013098958 A1 | | 7/2013 |
| WO | WO-2019230683 A1 * | | 12/2019 |

* cited by examiner

FIG. 4

| TRAVELING LANE | DIRECTION INDICATOR | PREDICTED TRAVELING ROUTE |
|---|---|---|
| LEFT LANE | LEFT ON | ROAD C |
| | OTHER THAN LEFT ON | ROAD B |
| CENTER LANE | — | ROAD B |
| RIGHT LANE | RIGHT ON | ROAD A |
| | OTHER THAN RIGHT ON | ROAD B |

FIG. 5
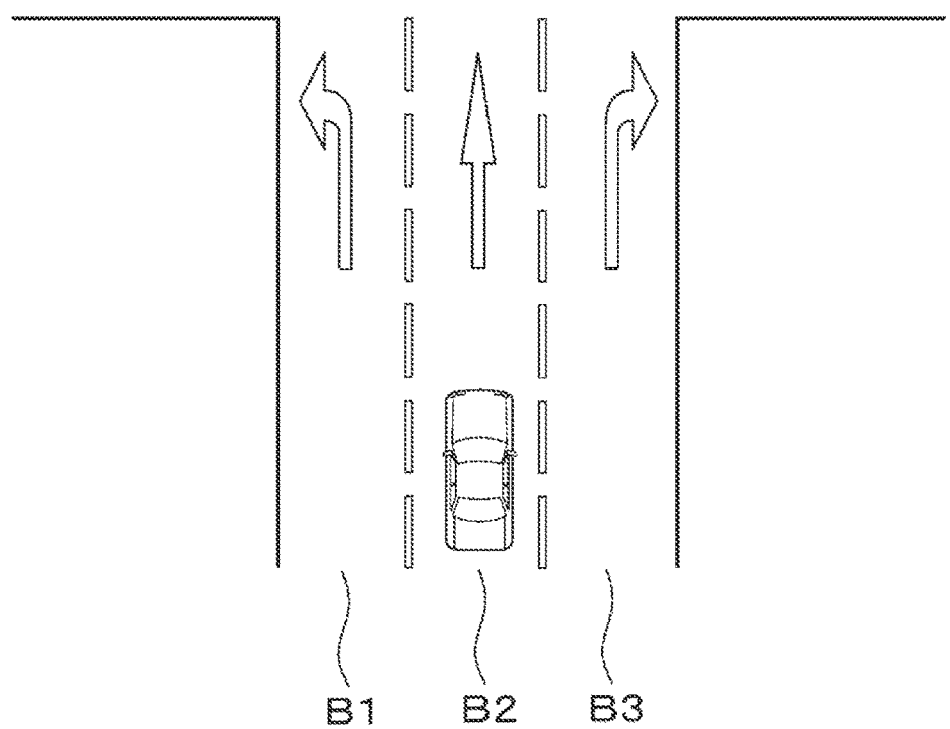
FIG. 6

RISK PREDICTION DETERMINATION DEVICE AND RISK PREDICTION DETERMINATION PROGRAM PRODUCT

CROSS REFERENCE TO RELATED APPLICATIONS

The present application is a continuation application of International Patent Application No. PCT/JP2021/016626 filed on Apr. 26, 2021, which designated the U.S. and claims the benefit of priority from Japanese Patent Application No. 2020-087419 filed on May 19, 2020. The entire disclosures of all of the above applications are incorporated herein by reference.

TECHNICAL FIELD

The present disclosure relates to a risk prediction determination device and a risk prediction determination program product.

BACKGROUND

There has been known a technology for risk prediction determination related to driving of vehicles.

SUMMARY

The present disclosure provides a risk prediction determination device including a predicted traveling route specifying unit, a risk location specifying unit, and a risk prediction determination unit. The predicted traveling route specifying unit specifies a predicted traveling route of a subject vehicle based on traveling lane information indicating a traveling lane of the subject vehicle, road type information indicating a type of a road around the subject vehicle, road link information related to a road link, and sensor information of the subject vehicle. The risk location specifying unit specifies a location with risk based on road shape information around the subject vehicle and location information of an obstacle. The risk prediction determination unit performs a risk prediction determination based on a specified result of the predicted traveling route specifying unit and a specified result of the risk location specifying unit.

BRIEF DESCRIPTION OF DRAWINGS

Objects, features and advantages of the present disclosure will become apparent from the following detailed description made with reference to the accompanying drawings. In the drawings:

FIG. 4 is a diagram showing specification of a predicted traveling route of the subject vehicle;

FIG. 5 is a diagram showing specification of a predicted traveling route of the subject vehicle;

FIG. 6 is a diagram showing specification of a predicted traveling route of the subject vehicle;

DETAILED DESCRIPTION

Figure 1:
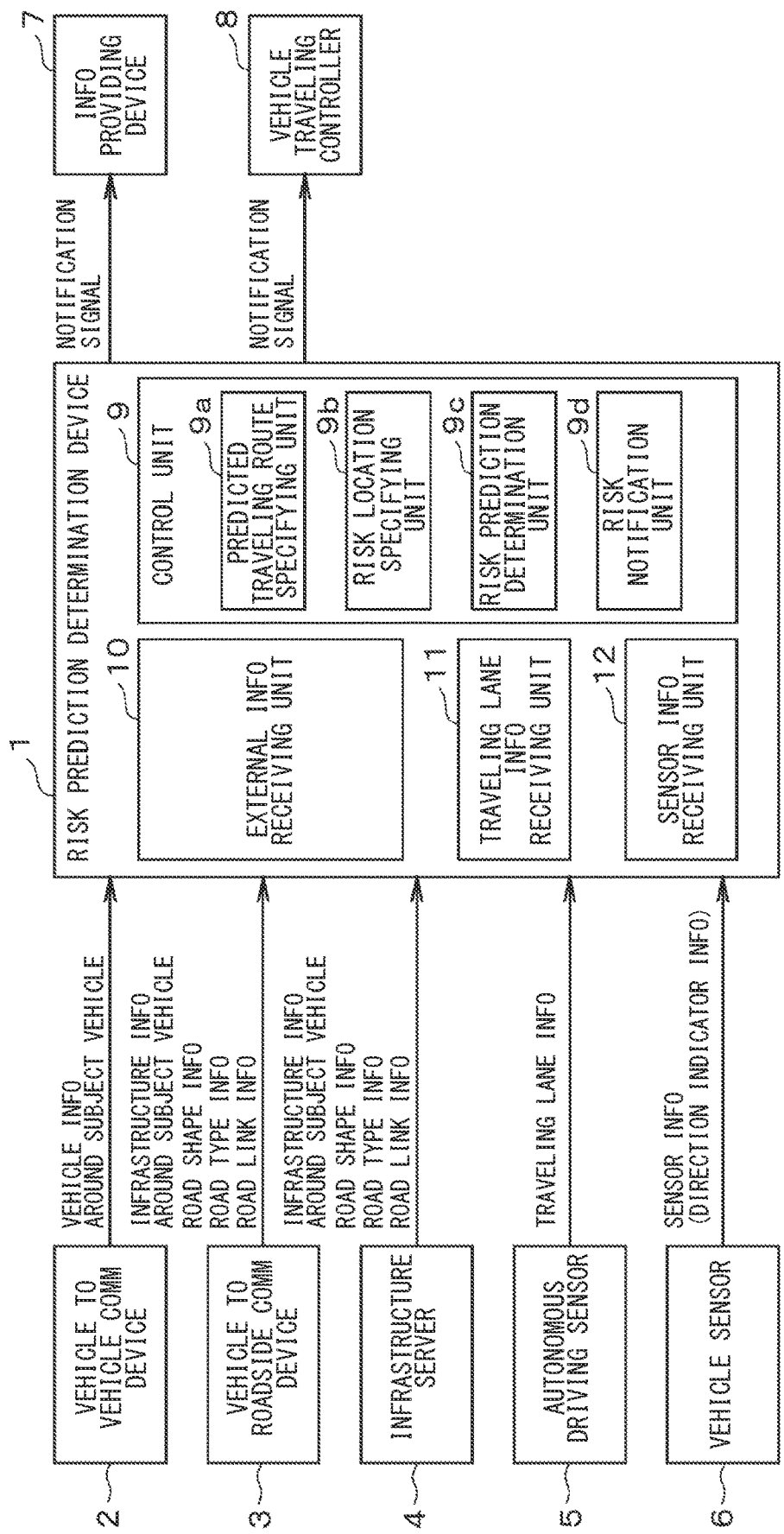
FIG. 1 is a functional block diagram showing an overall configuration according to an embodiment of the present disclosure.
Figure 2:
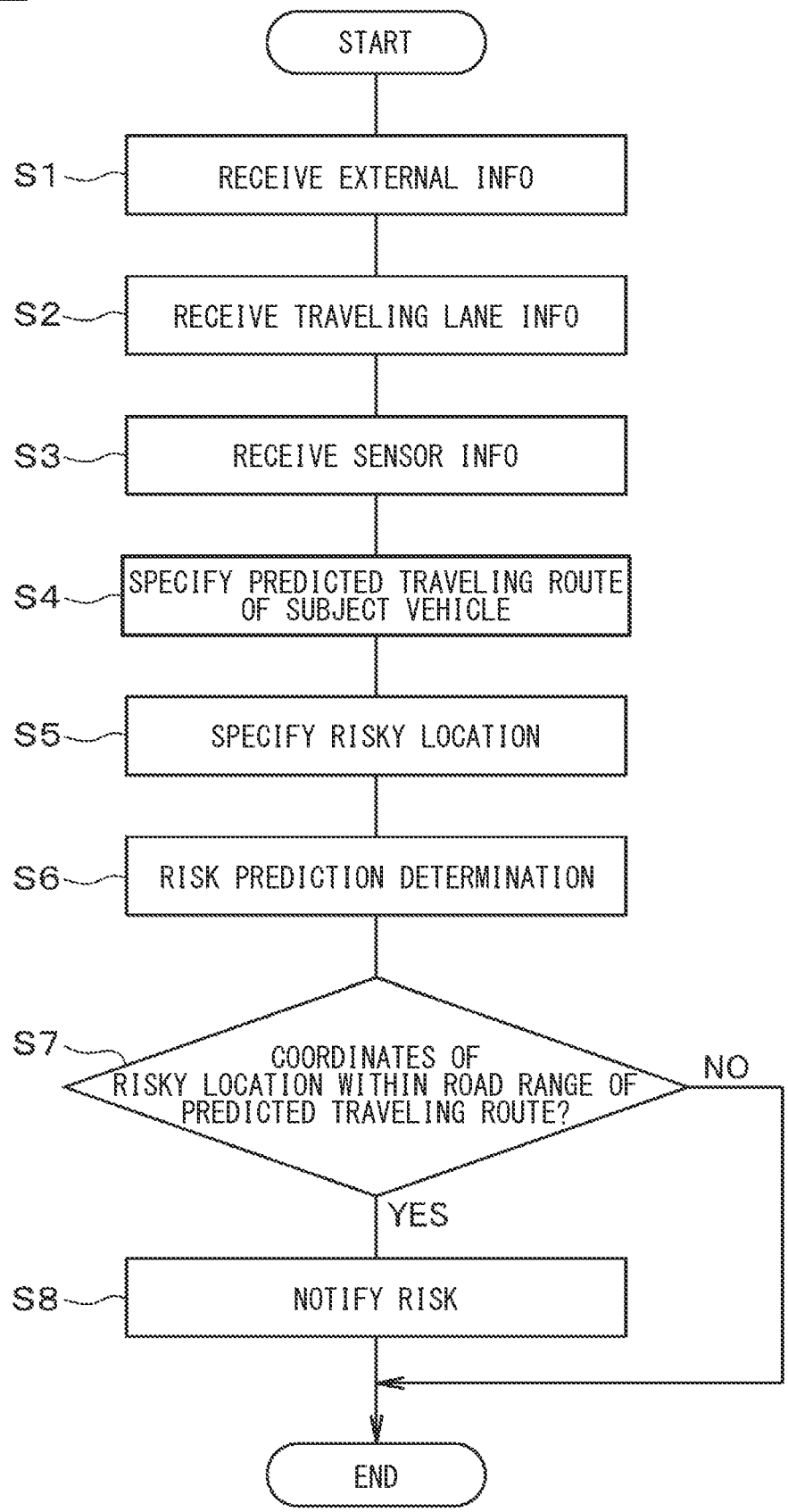
FIG. 2 is a flowchart showing a process executed by a risk prediction determination device according to an embodiment of the present disclosure.

Before describing embodiments of the present disclosure, a known technology for risk prediction determination related to driving of vehicles will be described. When highly precise map information is not provided, a risk prediction determination device having vehicle to vehicle communication function and vehicle to roadside communication function performs risk prediction determination about an obstacle existing around a subject vehicle, such as different vehicles, pedestrian, and dropped objects, based on vehicle information, which includes sensor information and position information, and obstacle information received by the vehicle to vehicle communication and the vehicle to roadside communication. When the high-precision map information is not provided, the risk prediction determination device performs the risk prediction determination only to an approaching risky event, and notifies the driver about the risky event. For example, a device may acquire road information related to road and obstacle information related to obstacle by the vehicle to vehicle communication and the vehicle to roadside communication, and perform the risk prediction determination based on the acquired road information and obstacle information.

The above-described device performs risk prediction determination based on only the road information and the obstacle information, regardless of traveling direction of the subject vehicle after passing through an intersection. For example, when there is a risky event exists in a straight traveling direction of the intersection toward which the subject vehicle is approaching, the risk prediction determination is performed not only when the subject vehicle straightly travels through the intersection, but also when the subject vehicle turns right or left at the intersection. However, such configuration performs risk prediction determination even when the subject vehicle does not travel through a risky location.

According to an aspect of the present disclosure, a risk prediction determination device includes a predicted traveling route specifying unit, a risk location specifying unit, and a risk prediction determination unit. The predicted traveling route specifying unit specifies a predicted traveling route of a subject vehicle based on traveling lane information indicating a traveling lane of the subject vehicle, road type information indicating a type of a road around the subject vehicle, road link information related to a road link, and sensor information of the subject vehicle. The risk location specifying unit specifies a location with risk based on road shape information around the subject vehicle and location information of an obstacle. The risk prediction determination unit performs a risk prediction determination based on a specified result of the predicted traveling route specifying unit and a specified result of the risk location specifying unit.

In the above configuration, the predicted traveling route of the subject vehicle is specified, and the location with risk is specified. The risk prediction determination is performed based on the specified predicted traveling route of the subject vehicle and the specified location with risk. By performing the risk prediction determination based on the specified result of predicted traveling route of the subject vehicle in addition to the specified result of the location with risk, the risk prediction determination can be performed more appropriately compared with a case where the risk prediction determination is performed based on only the specified result of the location with risk.

The following will describe an embodiment of the present disclosure with reference to the accompanying drawings. As shown in FIG. 1, the risk prediction determination device 1 is configured to receive various kinds of information from a vehicle to vehicle communication device 2 mounted on another vehicle, a vehicle to roadside communication device 3 installed to roadside, an infrastructure server 4 included in a communication network, an autonomous driving sensor 5 mounted on the subject vehicle, and a vehicle sensor 6. The autonomous driving sensor 5 includes, for example, a vehicle mounted camera for imaging a front area of the subject vehicle, millimeter wave radar, LiDAR (Light Detection and Ranging), and so on. The risk prediction determination device 1 is also able to transmit a notification signal to an information providing device 7 and a vehicle traveling controller 8.

The risk prediction determination device 1 includes a control unit 9, an external information receiving unit 10, a traveling lane information receiving unit 11, and a sensor information receiving unit 12. The control unit 9 is configured by a microcomputer, which includes a CPU (Central Processing Unit), a ROM (Read Only Memory), a RAM (Random Access Memory), and an I/O (Input/Output). By executing a computer program stored in a non-transitory tangible storage medium, the microcomputer can execute a program or a method corresponding to the computer program, and performs an overall control to the risk prediction determination device 1.

The external information receiving unit 10 performs the vehicle to vehicle communication with the vehicle to vehicle communication device 2 mounted on another vehicle, and receives, from the vehicle to vehicle communication device 2, information of another vehicle existing around the subject vehicle. The information of another vehicle existing around the subject vehicle includes sensor information and position information. The external information receiving unit 10 receives infrastructure information, road shape information, road type information, and road link information transmitted from (i) the vehicle to roadside communication device 3 by performing vehicle to roadside communication with the vehicle to roadside communication device 3 and (ii) the infrastructure server 4 by performing a wide area communication with the infrastructure server 4. The infrastructure information includes, for example, locations of constructions, stopping locations of abnormal vehicles, and locations of dropped objects. The infrastructure information corresponds to location information of obstacle. The road shape information includes information indicating a shape of a road including crossings, traffic lights, signs, and also includes coordinates of a center of the road and a width of the road. The road type information is information related to a type of the road, such as motorway, normal road, narrow street. The road link information is information related to connection of road links, or the like.

The traveling lane information receiving unit 11 receives the traveling lane information transmitted from the autonomous driving sensor 5. When the autonomous driving sensor 5 includes the vehicle mounted camera, the traveling lane information receiving unit 11 receives the traveling lane information based on imaging signals transmitted from the vehicle mounted camera. When the autonomous driving sensor 5 includes the millimeter wave radar and the LiDAR, the traveling lane information receiving unit 11 receives the traveling lane information based on the detected signals transmitted from the millimeter wave radar and the LiDAR.

The sensor information receiving unit 12 receives direction indicator information indicating an operation state of direction indicator as the sensor information transmitted from the vehicle sensor 6.

The control unit 9 includes, as functional blocks, a predicted traveling route specifying unit 9a, a risk location specifying unit 9b, a risk prediction determination unit 9c, and a risk notification unit 9d. These functional blocks correspond to a process included in the risk prediction determination program executed by the microcomputer.

The predicted traveling route specifying unit 9a specifies a predicted traveling route of the subject vehicle based on the traveling lane information, the road type information, the road link information, and the direction indicator information. The predicted traveling route specifying unit 9a acquires the traveling lane information, which is transmitted from the autonomous driving sensor 5 and received by the traveling lane information receiving unit 11. The predicted traveling route specifying unit 9a acquires the road type information and the road link information, which are transmitted from the vehicle to roadside communication device 3 and infrastructure server 4 and received by the external information receiving unit 10. The predicted traveling route specifying unit 9a acquires the direction indicator information, which is transmitted from the vehicle sensor 6 and received by the sensor information receiving unit 12. After the predicted traveling route specifying unit 9a specifies the predicted traveling route, the predicted traveling route specifying unit 9a further specifies a road range of the predicted traveling route based on the coordinates of the center of the road and the width of the road.

The risk location specifying unit 9b specifies the location with risk based on the acquired infrastructure information and the road shape information. The infrastructure information and the road shape information are transmitted from the vehicle to roadside communication device 3 and infrastructure server 4, and received by the external information receiving unit 10.

The risk prediction determination unit 9c performs risk prediction determination based on the specified result of the predicted traveling route specifying unit 9a and the specified result of the risk location specifying unit 9b. Which is to say, the risk prediction determination unit 9c compares (i) the road range of the predicted traveling route specified by the predicted traveling route specifying unit 9a based on the coordinates of the center of the road and the width of the road with (ii) the coordinates of the risky location specified by the risk location specifying unit 9b. When the coordinates of the risky location are determined to be within the road range of the predicted traveling route, the risk prediction determination unit 9c determines that the subject vehicle will travel through the risky location. When the coordinates of the risky location are determined to be out of the road range of the predicted traveling route, the risk prediction determination unit 9c determines that the subject vehicle does not travel through the risky location.

The risk notification unit 9d notifies the risk based on determination result of the risk prediction determination unit 9c. When the risk prediction determination unit 9c determines that the subject vehicle is going to pass through the risky location, the risk notification unit 9d notifies the risk by transmitting a notification signal to the information providing device 7 and the vehicle traveling controller 8. The information providing device 7 receives the notification signal transmitted from the risk notification unit 9d, and provides information to the driver about the approaching risk. When the vehicle traveling controller 8 receives the notification signal transmitted from the risk notification unit 9*d*, the vehicle traveling controller 8 performs vehicle traveling control, such as brake control and steering control for avoiding the approaching risk.

The following will describe an operation of the above configuration with reference to FIG. 2 to FIG. 8. The control unit 9 of the risk prediction determination device 1 periodically executes a risk prediction determination process at a predetermined executing timing at a predetermined period (for example every several milliseconds). When the risk prediction determination process starts, the control unit performs a receiving process of the external information by the external information receiving unit 10 (S1). Specifically, the control unit 9 receives, from the vehicle to vehicle communication device 2 mounted on another vehicle, information of another vehicle existing around the subject vehicle. The control unit receives the infrastructure information, the road shape information, the road type information, and the road link information transmitted from the vehicle to roadside communication device 3 and the infrastructure server 4.

The control unit 9 receives the traveling lane information with the traveling lane information receiving unit 11 (S2). Specifically, the control unit 9 receives the traveling lane information transmitted from the autonomous driving sensor 5. The control unit 9 receives the sensor information with the sensor information receiving unit 12 (S3). Specifically, the control unit 9 receives the direction indicator information transmitted from the vehicle sensor 6.

After the control unit 9 acquires the traveling lane information, the road type information, the road link information, and the direction indicator information, the control unit 9 specifies the predicted traveling route of the subject vehicle based on the acquired traveling lane information, the acquired road type information, the acquired road link information, and the acquired direction indicator information (S4, corresponding to predicted traveling route specifying process).

Figure 3:
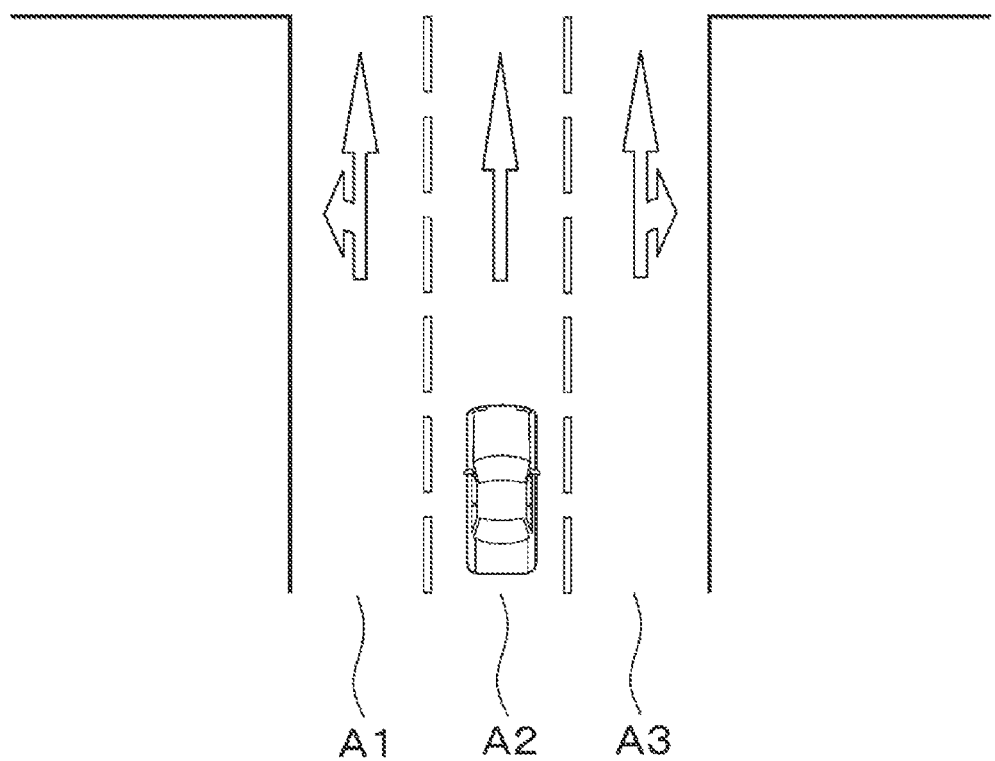
FIG. 3 is a diagram showing specification of a predicted traveling route of the subject vehicle.

As shown in FIG. 3, when the subject vehicle is traveling on one of a left lane A1 for left turn and straight traveling purpose, a center lane A2 for straight traveling purpose, or a right lane A3 for right turn and straight traveling purpose, the control unit 9 specifies the predicted traveling route based on the traveling lane of the subject vehicle and the operation state of the direction indicator as shown in FIG. 4. In a case where the subject vehicle is traveling on the left lane A1, (i) when a left direction indicator is in on state, the control unit 9 specifies the predicted traveling route as a road C in the left turn direction, (ii) when the left direction indicator is not in on state, the control unit 9 specifies the predicted traveling route as a road B in the straight traveling direction. When the traveling lane of the subject vehicle is the center lane A2, the control unit 9, regardless of the operation state of the direction indicator, specifies the predicted traveling route as a road B in straight traveling direction. In a case where the subject vehicle is traveling on the right lane A3, (i) when a right direction indicator is in on state, the control unit 9 specifies the predicted traveling route as the road A in the right turn direction, (ii) when the right direction indicator is not in on state, the control unit 9 specifies the predicted traveling route as the road B in the straight traveling direction. FIG. 3 shows an example when the subject vehicle is traveling on the center lane A2.

As shown in FIG. 5, when the subject vehicle travels on one of a left lane B1 for left turn purpose, a center lane B2 for straight traveling purpose, and a right lane B3 for right turn purpose, the control unit 9 specifies the predicted traveling route based on the traveling lane of the subject vehicle and the operation state of the direction indicator as shown in FIG. 6. When the traveling lane of the subject vehicle is the left lane B1, the control unit 9, regardless of the operation state of the direction indicator, specifies the predicted traveling route as the road C in the left turn direction. When the traveling lane of the subject vehicle is the center lane B2, the control unit 9, regardless of the operation state of the direction indicator, specifies the predicted traveling route as the road B in the straight traveling direction. When the traveling lane of the subject vehicle is the right lane B3, the control unit 9, regardless of the operation state of the direction indicator, specifies the predicted traveling route as the road A in the right turn direction. FIG. 5 shows an example when the subject vehicle is traveling on the center lane B2.

The control unit 9 acquires the infrastructure information and the road shape information, and then specifies the location with risk based on the acquired infrastructure information and the acquired road shape information (S5, corresponding to risky location specifying process).

Figure 7:
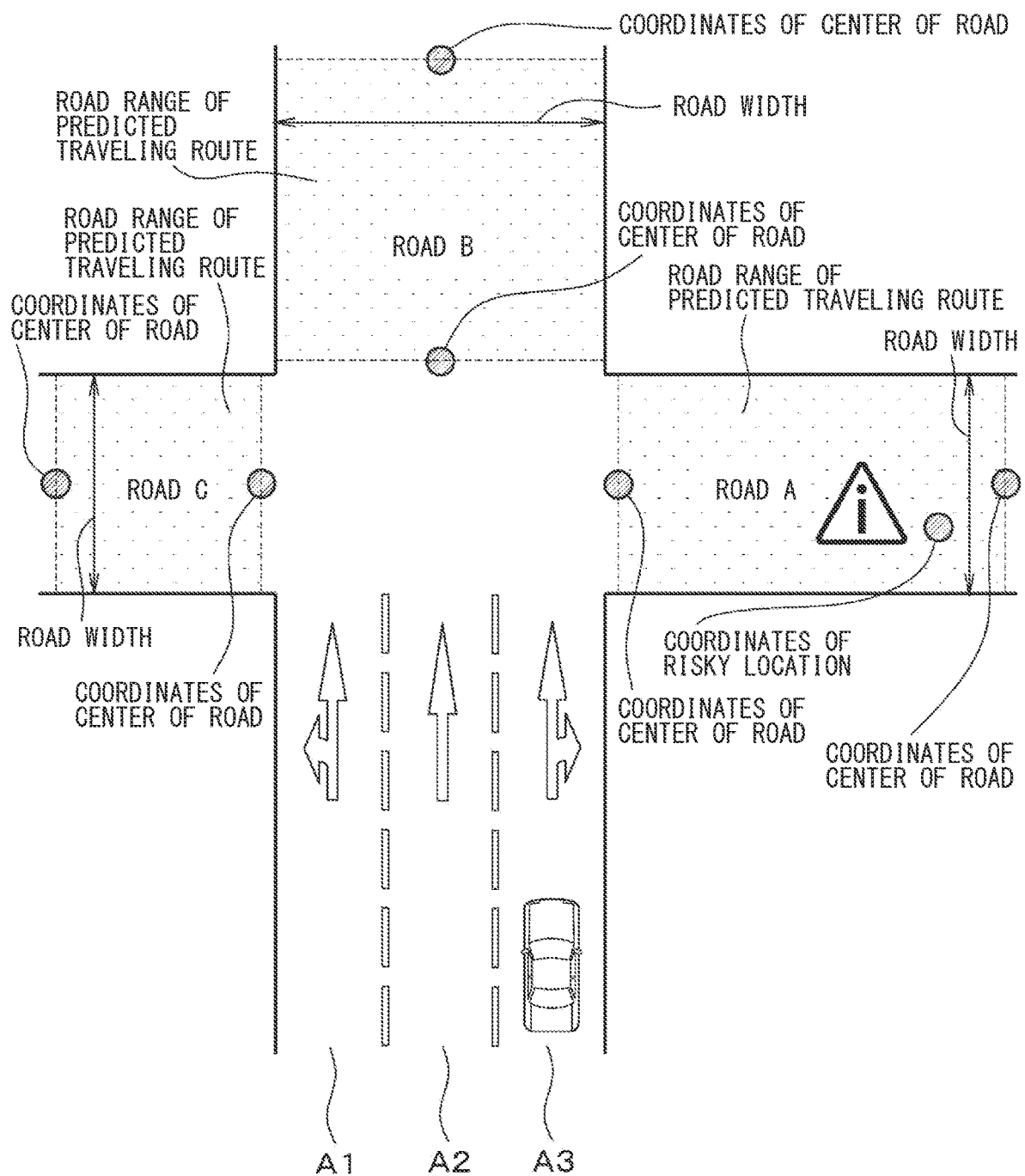
FIG. 7 is a diagram showing specification of a location with risk.
Figure 8:
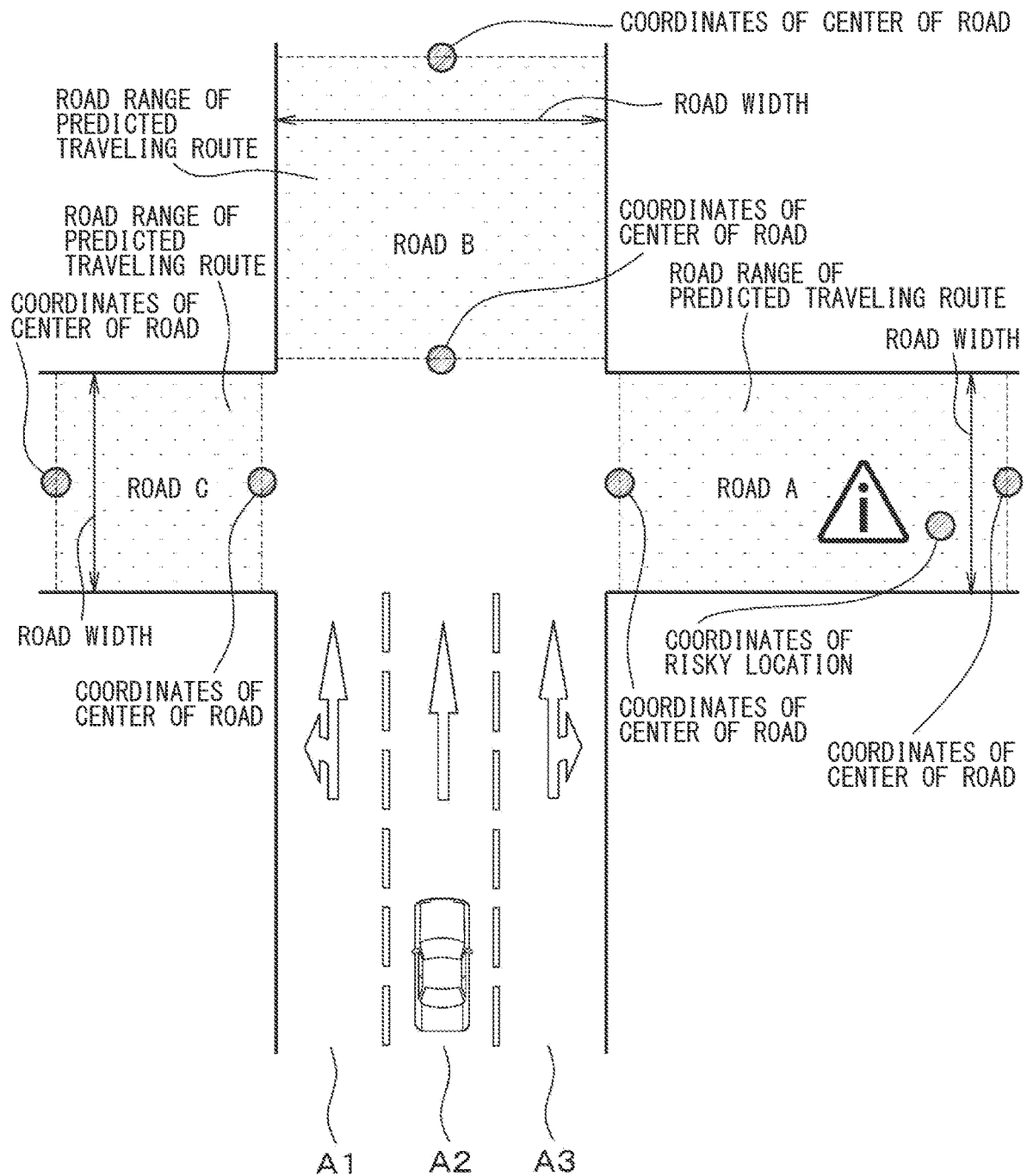
FIG. 8 is a diagram showing specification of a location with risk.

As shown in FIG. 7 and FIG. 8, the control unit 9 specifies the road range based on the coordinates of the center of the road and the width of the road, which are included in the road shape information around the subject vehicle. The control unit specifies the coordinates of the risky location based on the infrastructure information, and specifies the road with risky location. FIG. 7 and FIG. 8 show an example in which only one risky location is specified. When multiple risky locations exist in one or multiple roads, each road with one or more risky locations will be specified based on the coordinates of each risky location.

The control unit 9 compares the road range of the predicted traveling route and the coordinates of the risky location, and performs the risk prediction determination (S6, corresponding to risk prediction determination process). The control unit 9 determines whether the coordinates of the risky location are within or out of the road range of the predicted traveling route (S7). When the coordinates of the risky location are within the road range of the predicted traveling route (S7: YES), the control unit determines that the subject vehicle will travel through the risky location. Thus, the control unit 9 transmits the notification signal to the information providing device 7 and the vehicle traveling controller 8, notifies the risk (S8), and then ends the risk prediction determination process. After ending the current process, the control unit 9 waits for a next timing for performing the risk prediction determination process. As shown in FIG. 7, when the subject vehicle is traveling on the right lane A3 and the right direction indicator of the subject vehicle is in on state, the control unit 9 determines that the coordinates of the risky location are within the road range of the predicted traveling route, and notifies the risk.

When the control unit 9 determines that the coordinates of the risky location are out of the road range of the predicted traveling route (S7: NO), the control unit 9 determines that the subject vehicle does not travel through the risky location, and ends the risk prediction determination process. Then, the control unit waits for the next timing for performing the risk prediction determination process. As shown in FIG. 8, when the subject vehicle travels on the center lane A2, regardless of the operation state of the direction indicator, the control unit 9 determines that the coordinates of the risky location are out of the road range of the predicted traveling route, and does not notify the risk.

The present embodiment as described above can provide the following effects.

The risk prediction determination device 1 specifies the predicted traveling route of the subject vehicle, specifies the location with risk, and performs the risk prediction determination based on the specified results of the predicted traveling route and the location with risk. In the present embodiment, both of the specified result of the location with risk and the specified result of the predicted traveling route of the subject vehicle are taken into consideration for properly performing the risk prediction determination. Thus, compared with the risk prediction determination performed only based on the specified result of the location with risk, the risk prediction determination can be performed more appropriately.

The risk prediction determination device 1 receives the traveling lane information, the road type information, the road link information, and the direction indicator information. Then, the risk prediction determination device 1 specifies the predicted traveling route based on the received traveling lane information, the received road type information, the received road link information, and the received direction indicator information. Thus, the traveling route can be specified by taking the traveling lane information, the road type information, the road link information, and the direction indicator information into consideration comprehensively.

The risk prediction determination device 1 receives the infrastructure information and the road shape information. Then, the risk prediction determination device 1 specifies the location with risk based on the received infrastructure information and the received road shape information. Thus, the location with risk can be specified by taking the infrastructure information and the road shape information into consideration comprehensively.

The risk prediction determination device 1 specifies the road range of the predicted traveling route based on the coordinates of the center of the road and the width of the road. Then, the risk prediction determination device 1 compares the specified road range of the predicted traveling route with the coordinates of the risky location, and performs the risk prediction determination. The risk prediction determination device 1 compares the road range of the predicted traveling route with the coordinates of the risky location, and determines whether the coordinates of the risky location are within or out of the road range of predicted traveling route as the risk prediction determination.

In response to determining that the coordinates of the risky location are within the road range of the predicted traveling route, the risk prediction determination device 1 determines that the subject vehicle is going to travel through the risky location and notifies the risk to an occupant of the subject vehicle. In response to determining that the subject vehicle is going to travel through the risky location, information providing, such as notification of approaching risk may be performed to the driver of the vehicle. In response to determining that the subject vehicle is going to travel through the risky location, the vehicle traveling control, such as brake control or steering control for avoiding the risk may be performed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The control unit 9 and a method thereof as described in the present disclosure may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium.

What is claimed is:

1. A risk prediction determination device comprising:
    a traveling lane information receiving unit acquiring, from an autonomous driving sensor mounted on a subject vehicle, traveling lane information indicating a traveling lane of the subject vehicle;
    an external information receiving unit acquiring, from a vehicle to roadside communication device, road type information indicating a type of a road around the subject vehicle, road link information related to a road link, and road shape information indicating a shape of a road around the subject vehicle;
    a sensor information receiving unit acquiring, from a direction indicator, direction indicator information indicating an operation state of the direction indicator as sensor information;
    a predicted traveling route specifying unit specifying a predicted traveling route of the subject vehicle based on the traveling lane information, the road type information, the road link information, and the direction indicator information of the subject vehicle;
    a risk location specifying unit specifying a location with risk based on the acquired road shape information around the subject vehicle and location information of an obstacle; and
    a risk prediction determination unit performing a risk prediction determination based on a specified result of the predicted traveling route specifying unit and a specified result of the risk location specifying unit;
    wherein:
    the risk prediction determination unit specifies a road range of the predicted traveling route based on coordinates of a road center and a road width, the specified road range of the predicted traveling route being a range of road after the subject vehicle passes through an intersection;
    when the risk prediction determination unit determines that coordinates of the location with risk are within the specified road range of the predicted traveling route, (i) a risk notification unit provides, to a driver of the subject vehicle, information about an approach of the subject vehicle toward the location with risk or (ii) a vehicle travelling control unit performs a brake control or a steering control for avoiding the location with risk; and
    the risk prediction determination device is mounted on the subject vehicle and the specifying of the predicted traveling route of the subject vehicle by the predicted traveling route specifying unit and the specifying of the location with risk by the risk location specifying unit are executed in the subject vehicle.

2. The risk prediction determination device according to claim 1, wherein the external information receiving unit receives, as external information, the location information of the obstacle, the road type information, the road link information, and the road shape information, wherein the predicted traveling route specifying unit specifies the predicted traveling route of the subject vehicle based on the road type information and the road link information received by the external information receiving unit, and the risk location specifying unit specifies the location with risk based on the location information of the obstacle and the road shape information received by the external information receiving unit.

3. The risk prediction determination device according to claim 1, wherein the predicted traveling route specifying unit specifies the predicted traveling route based on the traveling lane information received by the traveling lane information receiving unit and the sensor information of the subject vehicle received by the sensor information receiving unit.

4. The risk prediction determination device according to claim 3, wherein the predicted traveling route specifying unit specifies the predicted traveling route based on the direction indicator information received by the sensor information receiving unit.

5. The risk prediction determination device according to claim 1, wherein the risk prediction determination unit performs the risk prediction determination by:

comparing the specified road range of the predicted traveling route with coordinates of the location with risk.

6. A risk prediction determination program product stored in a computer-readable non-transitory storage medium, the risk prediction determination program product including instructions to be executed by a control unit of a risk prediction determination device, the instructions comprising:

acquiring, from an autonomous driving sensor mounted on a subject vehicle, traveling lane information indicating a traveling lane of the subject vehicle;

acquiring, from a vehicle to roadside communication device, road type information indicating a type of a road around the subject vehicle, road link information related to a road link, and road shape information indicating a shape of a road around the subject vehicle;

acquiring, from a direction indicator, direction indicator information indicating an operation state of the direction indicator as sensor information;

specifying a predicted traveling route of the subject vehicle based on the traveling lane information, the road type information, the road link information, and the direction indicator information of the subject vehicle;

specifying a location with risk based on the acquired road shape information around the subject vehicle and location information of an obstacle;

performing a risk prediction determination based on the specified predicted traveling route of the subject vehicle and the specified location with risk;

specifying a road range of the predicted traveling route based on coordinates of a road center and a road width, the specified road range of the predicted traveling route being a range of road after the subject vehicle passes through an intersection; and when coordinates of the location with risk are determined to be within the specified road range of the predicted traveling route, (i) providing, to a driver of the subject vehicle, information about an approach of the subject vehicle toward the location with risk or (ii) performing a brake control or a steering control for avoiding the location with risk;

wherein the risk prediction determination device is mounted on the subject vehicle and the specifying of the predicted traveling route of the subject vehicle and the specifying of the location with risk are executed in the subject vehicle.

7. A risk prediction determination device comprising:

a computer-readable non-transitory storage medium; and a microcomputer, by executing a program stored in the computer-readable non-transitory storage, configured to:

acquire, from an autonomous driving sensor mounted on a subject vehicle, traveling lane information indicating a traveling lane of the subject vehicle;

acquire, from a vehicle to roadside communication device, road type information indicating a type of a road around the subject vehicle, road link information related to a road link, and road shape information indicating a shape of a road around the subject vehicle;

acquire, from a direction indicator, direction indicator information indicating an operation state of the direction indicator as sensor information;

specify a predicted traveling route of the subject vehicle based on the traveling lane information, the road type information, the road link information, and the direction indicator information of the subject vehicle;

specify a location with risk based on the acquired road shape information around the subject vehicle and location information of an obstacle;

perform a risk prediction determination based on the specified predicted traveling route of the subject vehicle and the specified location with risk;

specify a road range of the predicted traveling route based on coordinates of a road center and a road width, the specified road range of the predicted traveling route being a range of road after the subject vehicle passes through an intersection; and when coordinates of the location with risk are determined to be within the specified road range of the predicted traveling route, (i) provide, to a driver of the subject vehicle, information about an approach of the subject vehicle toward the location with risk or (ii) perform a brake control or a steering control for avoiding the location with risk;

wherein the risk prediction determination device is mounted on the subject vehicle and the specifying of the predicted traveling route of the subject vehicle and the specifying of the location with risk are executed in the subject vehicle.

\* \* \* \* \*